June 24, 1952  C. L. SHOBE  2,601,230
VALVE OPERATING MECHANISM
Filed July 11, 1947  2 SHEETS—SHEET 2
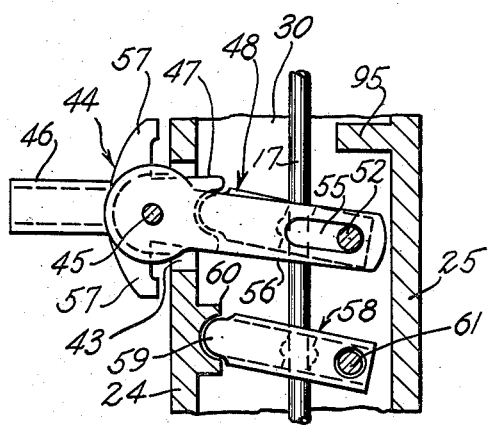
Fig. 3
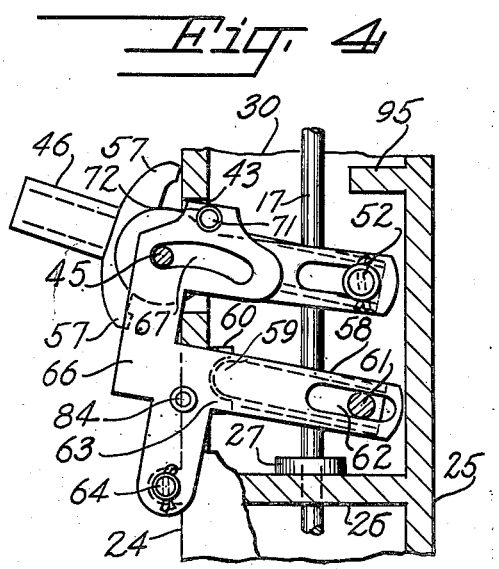
Fig. 4
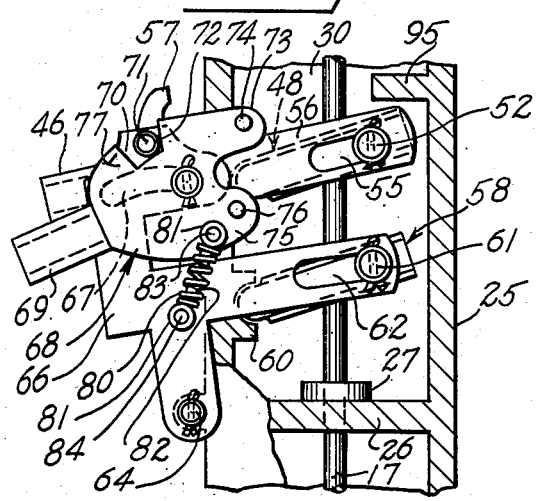
Fig. 5
Fig. 6
Fig. 7
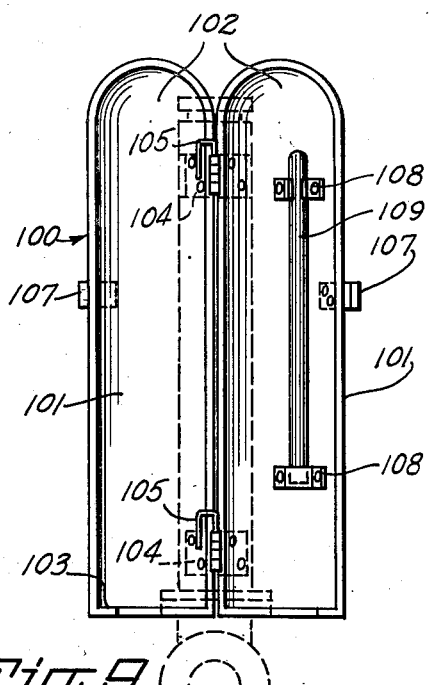
Fig. 8
INVENTOR.
Chester L. Shobe
BY
McMorrow, Berman & Davidson
Attorneys Patented June 24, 1952

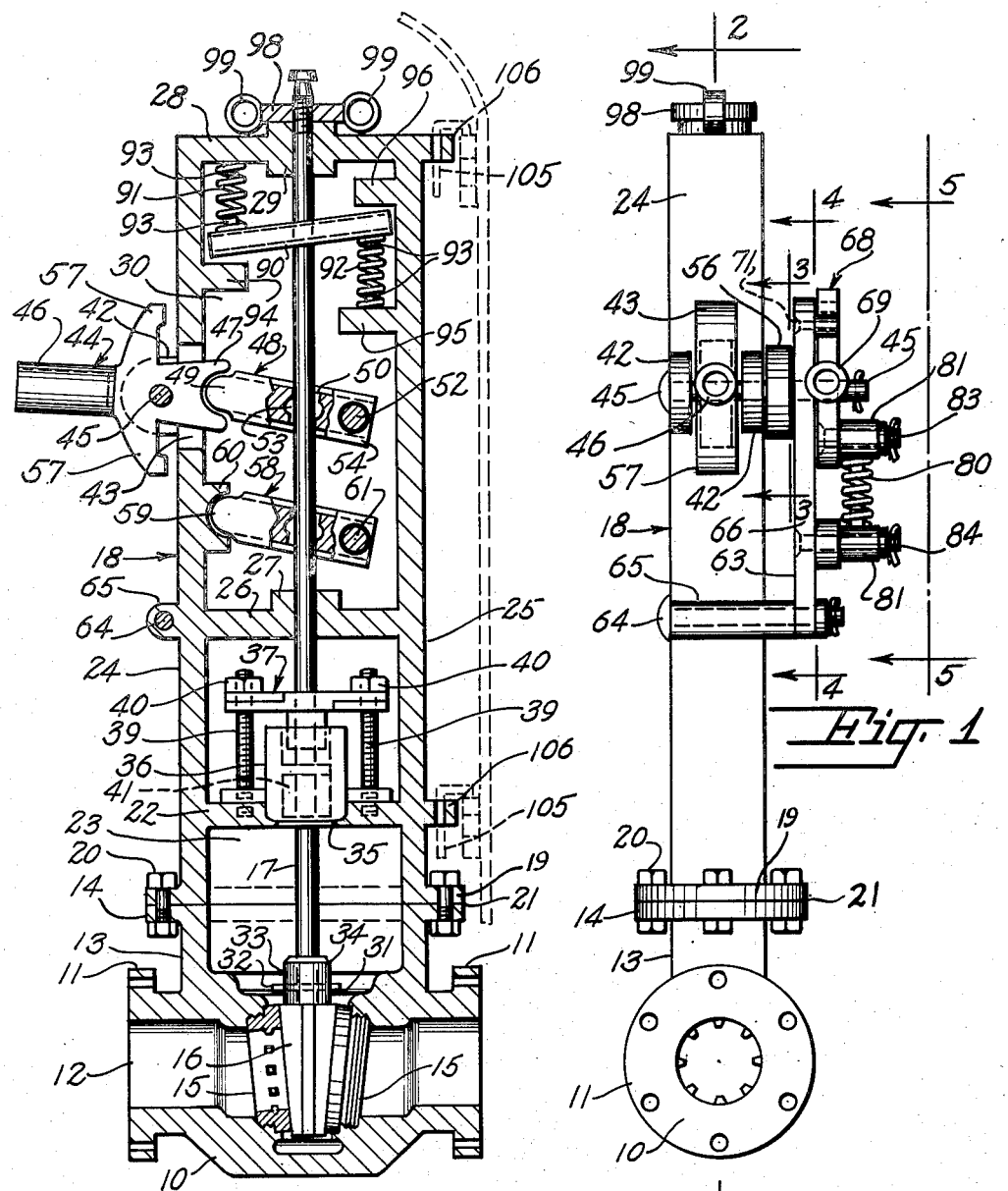

2,601,230

UNITED STATES PATENT OFFICE 2,601,230

VALVE OPERATING MECHANISM

Chester L. Shobe, Great Bend, Kans.

Application July 11, 1947, Serial No. 760,268

6 Claims. (Cl. 251—60)

This invention relates to improvements in valve operating mechanisms, and more particularly to an improved mechanism for opening and closing valves, such as gate valves, having longitudinally movable valve stems.

At the present time substantially all large valves and many smaller ones are provided with longitudinally movable stems for opening and closing such valves. Most of the larger valves are of the gate-valve type in which a wedged-shaped valve gate fits between opposed, inclined annular valve seats mounted in a hollow valve body adapted to be interposed in a fluid line.

Conventionally, an externally-threaded valve stem is secured at one end to the valve gate and extends through a valve bonnet which provides a space into which the gate may be withdrawn away from its valve-closing association with the valve seats, through a stuffing box in the outer end of the bonnet, and through a bearing at the outer end of a frame extending outwardly from the bonnet. A handwheel having an internally-screw-threaded hub is threaded onto the stem beyond the frame bearing and held against movement toward and away from the bearing so that rotation of the handwheel will impart longitudinal movement to the stem in the desired direction to move the valve toward or away from the valve seats.

Such gate-type valves have a range of sizes from valves for pipes or tubing of around 2-inches diameter or less, to valves for pipe lines, water mains and other large conduits having a diameter of 36-inches or more.

While the handwheel or screw-shaft operation of all such valves is slow and laborious, it is particularly disadvantageous in the case of the larger valves as it is not possible to open or close such valves with sufficient rapidity to avoid stalling, over-loading or over-speeding of pumping or compressing equipment, the effort of two or three men is frequently required to open or close such valves, the wear on the threads of the stem and wheel is excessive so that frequent repair and replacement of parts is necessary, and the stems are subject to frequent breakage, particularly in cold weather, because of the combined torsional and tensile or compressive forces to which they are subjected.

It is among the objects of the present invention to provide an improved valve-operating mechanism which is particularly adapted to the operation of gate valves, but may be used to operate other devices, such as piston valves, water-control gates of irrigation systems, flood-control gates, the gates or valves of storage receptacles such as grain or coal bins, etc., which mechanism is easily operable by one person to quickly open or close a large valve, which is applicable to gate valves of different sizes and to other structures operable by a longitudinally movable stem or shaft, which is positive in operation, simple in construction, economical to manufacture, easy to repair or service, and durable in operation, and which may be applied to a conventional gate valve or equivalent structure without requiring any material changes in the gate valve or other structure for the application of the improved valve-operating mechanism thereto.

Other objects and advantages will become apparent from a consideration of the following description in conjunction with the accompanying drawings, wherein:

Figure 1 is a longitudinal end elevation of a valve-operating mechanism illustrative of the invention showing the application of the operating mechanism to a conventional valve.

Figure 2 is a longitudinal cross-section on the line 2—2 of Figure 1.

Figure 3 is a longitudinal cross-section of a fragmentary portion of the valve-operating mechanism taken on the line 3—3 of Figure 1.

Figure 4 is a longitudinal cross-section similar to Figure 3 taken on the line 4—4 of Figure 1.

Figure 5 is a longitudinal elevation of a fragmentary portion of the valve-operating mechanism shown in Figure 1 looking at the mechanism from the position of the line 5—5 of Figure 1.

Figure 6 is a composite illustration of the two separable parts of a split stuffing box gland constituting an operative component of the mechanism.

Figure 7 is a top plan view of the gland portions illustrated in Figure 6 when assembled in operative association.

Figure 8 is a top plan view of a valve-stem-gripping block particularly illustrated in Figure 2 and constituting an operative component of the mechanism; and Figure 9 is a longitudinal inside-elevation of a two-part cover for the valve-operating mechanism showing the cover in open position.

With continued reference to the drawings, the improved valve operating mechanism is shown as applied to a gate-type valve of conventional construction. It is to be understood, however, that the mechanism may be applied to other types of valves and to other structures, as may be found convenient or desirable, as explained above.

The conventional gate valve illustrated comprises a hollow body portion 10 provided with opposed apertured flanges 11 which surround the opposite ends of the valve bore 12 and receive the flanged ends of the pipe or tubing connected to the valve and with an extension 13 disposed at right angles to and opening into the bore 12 which extension is provided at its outer end with an apertured external flange 14 to which the lower end of a valve bonnet is secured. Valve seat rings 15 are screw threaded into the valve body intermediate the length of the bore 12 and are inclined somewhat upwardly and outwardly to receive between them a wedge-shaped valve gate 16 which is movable up and down in the valve body to contact the opposed faces of the valve seat rings 15, as illustrated in Figure 2, to close the valve or to be displaced from the valve seat rings into the valve extension 13 and the valve bonnet so that the bore 12 is substantially unobstructed between the valve seat rings.

The valve gate is moved between its valve-closing and valve-opening positions by an elongated valve stem 17 connected at one end to the wider edge of the valve gate and normally provided as a screw shaft to which longitudinal movement is imparted by a handwheel, as explained above.

In the improved valve-operating mechanism the stem 17 is provided as a smooth, hardened shaft, preferably cylindrical in form, without screw threads except at its extreme end portions, and may have its end portion connected to the valve gate and passing through the valve bonnet, chromium plated or otherwise surface-hardened to prevent wear of the rod by the stuffing or packing box provided on the bonnet surrounding the stem, and is slidably supported for longitudinal movement in a hollow frame, generally indicated at 18.

The frame 18 has a cross-sectional shape substantially the same as the shape of the open end of the valve-body extension 13 and is provided at one end with an apertured flange 19 which is secured to the flange 14 by suitable fastening elements, such as the bolts 20, a gasket 21 being interposed between the opposed faces of the flanges 14 and 19. Inwardly of the flange 19 the frame is provided with an internal transverse partition 22 and between this partition and the flange 19 is closed on all sides to provide in the end of the frame a concavity 23 constituting a bonnet for the valve into which the gate 16 may be withdrawn when the valve is opened. Beyond the partition 22 from the flange 19 the frame comprises a pair of substantially straight, parallel, longitudinal end members 24 and 25, connected intermediate their length by an internal transverse web or partition 26 having a centrally-located apertured boss 27 thereon, and an end-wall 28 having a centrally-located apertured boss 29. The valve stem 17 is slidably supported in the bosses 27 and 29 and extends through a central aperture in the partition 22. The frame may have a side-wall 30 connecting the longitudinal end members 24 and 25 at one side of the frame, if desired, but it is within the scope of the invention to leave the sides of the frame open between the members 24 and 25.

The lower end of the stem 17, as illustrated in Figure 2, is threaded into an internally-screw-threaded boss 31 provided on the wider edge of the valve gate 16 and is secured in operative position in the boss by suitable means such as the through pin 32. A bushing 33 having a beveled upper edge 34 is press fitted onto the lower end of the stem and positioned such that when the valve is fully opened the beveled edge 34 will contact a beveled valve seat 35 provided around the lower end of the central aperture in the lower internal partition 22 so that when the valve is fully opened under pressure any fluid under pressure in the body 10 will be sealed in the valve bonnet and cannot escape therefrom.

A cylindrical stuffing box 36 is seated in an enlargement of the upper end portion of the aperture through the partition 22 surrounding the valve stem 17 and contains packing material compressed around the valve stem by a two-part stuffing box gland, generally indicated at 37 and particularly illustrated in Figures 6 and 7.

The two parts 37a and 37b of the split gland 37 are substantially identical and each comprises a flat plate having apertured end portions recessed at opposite sides and one-half of a circular aperture substantially midway the length of the inner edge thereof, and one-half of a hollow cylindrical bushing 38 secured at its end to one face surface of the plate around the semicircular central aperture.

The packing gland is made in two separable parts so that it may be assembled with and disassembled from the valve stem 17 to lubricate, repair or replace the packing whenever necessary or desired. When the two parts of the gland are assembled, as illustrated in Figure 7, the gland comprises a flat plate having a circular central aperture and apertured end portions with a hollow cylindrical bushing depending from one side thereof which bushing fits into the upper end of the stuffing box 36. Tightening bolts 39 secured at their lower ends in the transverse partition 22 extend through the end apertures in the packing gland plate and receive nuts 40 which are threaded down on the plate portion of the gland to compress the packing in the stuffing box between the lower end of the gland bushing and the upper end of a bushing 41 fixed in the lower end of the stuffing box.

With the above arrangement the packing may be renewed when the valve is completely closed since at that time all fluid under pressure is cut off by the valve from the valve bonnet. The packing may also be renewed with the valve fully opened since the beveled edge 34 of the bushing 33 will seat against the beveled valve seat 35 in the partition 22 to preclude the escape of any fluid under pressure from the valve bonnet when the packing is being removed from, or replaced in the stuffing box.

A pair of spaced-apart apertured lugs 42 extend outwardly from the end member 24 of the frame disposed one at each side of an elongated, substantially rectangular opening 43 in the end member. A manually-operable jack lever, generally indicated at 44, is pivotally mounted on a fulcrum pin 45 which extends through the lugs 42 and the lever. Outwardly of the pin the lever is provided with a socket 46 for a jack handle and is provided inwardly of the pin with a fork 47 having a curved recess which receives the adjacent rounded-edge portion of a jack friction block, generally indicated at 48, and particularly illustrated in Figure 8.

The block 48 comprises an elongated, substantially rectangular member having a width somewhat greater than its thickness and a length materially greater than its width. One end portion of the block is semi-circularly curved, as indicated at 49, about a center line extending across the width of the block substantially midway the thickness thereof and is provided in its mid-length portion with an aperture 50 extending through the thickness of the block and receiving the valve stem 17. An aperture 51 extends through the width of the block at the end thereof opposite the rounded end 49 and receives a pin 52 for a purpose which will presently appear. The hole or aperture 50 is enlarged or counterbored intermediate its length, as indicated at 53, to provide wear-resisting edge portions at the ends of the aperture which will firmly grip the sides of the stem 17. The provision of this intermediate enlargement or counterbore greatly delays the rounding of the sides of the stem-receiving aperture by wear and provides a firmer and more positive grip between the block and the stem during the operation of the valve-operating mechanism. The block is preferably reinforced by strengthening ribs 54 provided along the longitudinal edges thereof.

As particularly illustrated in Figure 3, the pin 52 passes through slot 55 in the end portion of a straight link 56 the opposite end of which is provided with an aperture through which the lever fulcrum pin 45 extends, the slot 55 being of a length to permit free operation of the block 48 by the lever 44 without binding or bending the stem 17.

With the arrangement so far described and with the position of the block 48 as illustrated in Figures 2 and 3, downward movement of the socket 46 of lever 44 about the pin 45 will raise the edge 49 of the block received in the fork 47 of the lever, thereby raising the stem 17 in the frame 18.

At each side of the aperture therein receiving pin 45, lever 44 is provided with outwardly-extending arms 57 which contact the outer surface of frame end member 24 at opposite ends of slot 43 to limit pivotal movement of the lever about the fulcrum pin to thereby prevent a too rapid movement of the valve stem relative to the supporting frame and preclude the fork 47 from moving out of operative association with the associated end of the block 48.

Between the block 48 and the partition 26 an apertured holding block 58 surrounds the valve stem 17 which block is similar in all respects to block 48 described above, and has a rounded end 59 engaged in a rounded recess or fork 60 integrally formed on the inner surface of the frame end member 24 and projecting therefrom. The purpose of the block 58 is to releasably hold the stem 17 in the position to which it is brought by block 48 under operation of the manually-operated lever 44.

A pin 61 extends transversely through the end of block 58 opposite the rounded end 59 and through an elongated slot 62 in the end portion of a bell crank lever 63 pivotally mounted on a fulcrum pin 64 secured in an apertured boss 65 formed on the outer side of frame end member 24 substantially at the level of partition 26 and extending transversely across the width of the end member. The bell crank arm 66 of lever 63 extends upwardly from pin 64 and is provided in its upper end with an arcuate slot 67 through which the fulcrum pin 45 extends, as is clearly illustrated in Figure 4.

A manually-operated, jack-shifting, toggle lever, generally indicated at 68, is pivotally mounted on the fulcrum pin 45 and is provided with a jack-handle socket 69 extending therefrom outwardly of the pin, the socket 69 preferably being the same size as the socket 46 so that the same handle can be used to operate both the jack-operating lever 44 and the toggle lever 68. The toggle lever is provided in its upper end, as illustrated in Figure 5, with an elongated recess or fork 70 which receives a stud 71 fixed to, and extending outwardly from the upper end of the bell-crank arm 66 of the link 63 and preferably surrounded by a roller bushing 72. The inner arm 73 of the fork 70 is provided with an inwardly-directed stud 74 positioned to engage the top edge of the straight link 56 in one operative position of the toggle lever and the toggle lever is provided below the arm 73 with a lower arm 75 which carries an inwardly-projecting stud 76 which is engageable with the lower edge of the link 56 in a different operative position of the toggle lever.

As illustrated in Figure 3, the toggle lever 68 is in position lowering the outer ends of the blocks 48 and 58 for upward movement of the valve stem while in Figure 5 the toggle lever is positioned to raise the outer ends of the blocks for downward movement of the valve stem. When socket 69 is in its upper operative position, arm 77 of fork 70 will force stud 71 to the right, as viewed in Figure 5, turning the bell-crank link 63 about the pivot pin 64 and pushing the slotted end of the link downwardly carrying the pin 61 downward with it. This will lower the end of block 58 remote from the fixed fork 60. At the same time, stud 74 will contact the upper edge of straight link 56 pushing the slotted end of the link 56 downwardly carrying with it the pin 52 which will force downwardly the end of block 48 remote from fork 47 of lever 44. Blocks 48 and 58 now being inclined downwardly and outwardly from their respective supporting forks, downward movement of socket 46 of lever 44 will raise block 48 and lift the valve stem 17. The outer end of block 58 will lift sufficiently to permit the valve stem to slide through it, but will drop as soon as the lifting force of the block 48 on the valve stem is released and will then cramp against the sides of the valve stem and hold the valve stem in the raised position to which it has been brought by the block 48. If the socket 46 is then raised, the curved end of block 48 will be lowered and the block will slide downwardly on the valve stem for a new grip whereupon the socket 46 may be again forced down, again raising the valve stem and the valve stem may thus be raised in a step-by-step operation as the socket 46 is moved up and down by a jack handle inserted therein.

With the valve stem 17 in raised position, if the socket 69 of the toggle lever 68 is now forced downwardly the arm 73 of the fork 70 will contact stud 71 forcing the bell-crank lever 63 to pivot about pin 64 raising the end of this lever in which the slot 62 is provided and thereby raising the pin 61 and the outer end of block 58. At the same time stud 76 contacts the lower edge of straight link 56 forcing upwardly the end of the link 56 containing the slot 65 and thereby raising the pin 52 and the outer end of block 48. Blocks 48 and 58 will then be inclined outwardly and upwardly from their respective supporting forks. If the socket 46 of the jack-operating lever be now raised by the jack handle the block 48 will be forced downwardly carrying with it the stem 17 forcing the stem-connected valve gate downwardly or inwardly against frictional forces and the force of any fluid pressure that may be contained in the valve body. The other end of block 58 will drop sufficiently to permit the valve stem to slide therethrough, but upon release of the downwardly-directed force exerted by block 48, block 58 will cramp against the sides of the valve stem and prevent it from rising in the frame. The process may be continued in the manner described above until the stem has been forced downwardly to its full extent in a step-by-step operation.

When the valve stem 17 is brought to its limiting position in either direction it will be locked in such extreme position by the block 58 which grips the shaft under force of spring 89 and thus serves to lock the valve in either its closed or its wide-open position until the gripping engagement of block 58 with the shaft is released by movement of socket 69 and toggle lever 68.

Because of the comparatively large frictional forces in the stuffing box and other bearings of the valve stem, and the effect of fluid pressure on the valve gate, and because it is frequently desired to mount such a valve in a longitudinal, angular, or inverted position it is necessary that the valve-operating means be effective to jack the valve stem in both directions to open and close the valve.

A toggle spring 80 is provided between the jack-shifting toggle lever 68 and the bell-crank 63 to resiliently hold the jack-shifting lever in the selected one of its operative positions. This spring may conveniently comprise a coiled compression spring secured between abutments 81 and surrounding telescopically associated guides 82, the opposite portions of which are connected respectively to the abutments 81. One of the abutments 81 is mounted on a stud 83 extending outwardly from the toggle lever 68 and the other abutment is mounted on a stud 84 extending outwardly from the bell-crank link 63; the distance between the studs 83 and 84 being such as to maintain the spring 82 under compression. The spring expands upon movement of the toggle lever 68 in either direction past a medial position to resiliently hold the lever in the selected operative position.

Since it is necessary to shift the blocks 48 and 58 against gravity and pressure forces exerted on the valve stem 17, the jack-shifting toggle lever 68 and its socket 69 are made substantially as rugged as the jack-operating lever 44 so that the valve stem may be given the necessary movement incident to shifting the jack cramp blocks.

Since it is necessary, as explained above, to positively jack the stem 17 in both directions of movement in most cases, it has been found desirable to provide safety means effective to prevent the stem and the valve gate from falling in case the stem should be moved down when there is no pressure in the valve body and when the frictional forces are insufficient to support it, or to keep the gate and stem from suddenly rising under a surge of pressure in the valve body. Such safety means may be conveniently provided by an apertured block 90 which surrounds the upper-end portion of the stem 17 and extends transversely across the upper-end portion of the interior of the frame 18. This block is provided with a stem-receiving aperture similar to the aperture 50 provided in the block 48 and is resiliently supported in operative position by coiled compression springs 91 and 92. The spring 92 bears at its upper end against the under surface of the end wall 26 of the frame and at its lower end against the upper surface of the corresponding end portion of the block 90, being held in operative position by suitable studs 93. An abutment 94 extends outwardly from the frame end wall 24 immediately below the end of the block engaged by the lower end of spring 91. The similar spring 92 rests at its lower end upon a base or abutment 95 extending inwardly from the frame side member 25 and supports at its upper end the corresponding end of the block 90; this spring also being held in position by suitable studs 93. An abutment 96 extends inwardly from the frame end wall 25 immediately above the end of the block 90 supported on the spring 92, as is clearly illustrated in Figure 2, the springs 91 and 92 cramp the block 90 into binding engagement with the sides of stem 17 so that the stem cannot move in either direction without compressing one of the springs. The strength of these springs is made sufficient to restrain the stem against movement under the influence of gravity and other incidental forces. When the stem is moved downwardly by the jack, however, the spring 92 will be compressed until the opposite end of the block 90 comes into contact with the abutment 94 whereupon the block will be squared with the stem and the stem will slide therethrough. Similarly, when the stem is moved upwardly by the jack the spring 91 will be compressed until the opposite end of the block contacts the abutment 96 whereupon the block will be squared with the shaft and the shaft will then slide freely through the block under the influence of the force exerted thereon by the jack mechanism.

It frequently happens that when a valve has been closed for a long time the gate becomes stuck to the seat ring by rust or corrosion and the stem may become similarly stuck or frozen to its supporting bearings in the frame and it is thus extremely difficult to break the valve loose and start its opening movement. To assist in overcoming this difficulty a nut 98 is threaded onto the upper screw-threaded end of stem 17 and bears upon the upper surface of boss 29 carried by end wall 28. Nut 98 is provided with sockets 99 of a size to receive the jack handle used to operate the jack-operating lever 44 and the jack-shifting-toggle lever 68. By tightening the nut 98 a tensional or stretching force can be applied to the stem 17 to assist the jack in breaking loose the valve gate and stem for an initial opening movement. After the stem has been raised the nut 98 must be run back to the upper end of the stem in order to permit the valve to completely close at the next closing operation.

A suitable casing, generally indicated at 100, and particularly illustrated in Figure 9 is provided to protect the valve mechanism against the effects of exposure to weather and to prevent tampering by unauthorized persons. This casing may comprise two similar cover members 101 of semi-circular or other cross-sectional shape such as will permit them to fit about and completely enclose the jack-operating mechanism including the sockets 46 and 69 and the nut 98. These members are preferably provided with dome-shaped ends 102 that completely close together over the top of the mechanism and have their bottom ends inwardly flanged, as indicated at 103, to underlie the valve body flange 14 and the connecting bolts 20, to protect the bolts from rusting by exposure to the weather. The two casing halves 101 are hinged together at adjoining edges by suitable hinges 104, the pins of which are provided with inwardly and downwardly-directed hooks 105 which are received in the apertures of apertured lugs 106 extending outwardly at spaced-apart intervals from the outer surface of the frame end member 25 to support the cover on the frame. Respective eyes or hasps 107 are secured to the members 101 and project beyond the edges thereof opposite the hinged edges to receive a padlock by means of which the two halves of the casing may be locked together completely enclosing the valve-operating mechanism. One of the cover members is provided on its inner surface with a pair of clips 108 which support a jack handle 109 for convenient access by an authorized person who wishes to open or close the valve, who is provided with a key for unlocking the cover.

There is thus provided an improved valve-operating mechanism which is rapid and positive in operation, requiring a minimum amount of manual effort, which is easy to service, is simple in construction and economical to manufacture and is fully protected against the effects of weather or tampering by unauthorized persons.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A valve operating mechanism comprising an elongated hollow frame; a smooth, elongated valve stem slidable lengthwise in said frame and adapted to be connected at one end to a movable valve gate; a manually-movable lever pivotally mounted in one side of said frame; an apertured block surrounding said stem and operatively engaged with said lever to move said stem lengthwise relative to said frame upon movement of said lever; means pivotally connecting said block to said frame; a second apertured block surrounding said stem at a position spaced from said stem-moving block and operatively engaged with said frame to hold said stem in position to which it is brought by said stem-moving block; means pivotally connecting said stem-holding block to said frame; manually-operable means carried by said frame and operatively associated with said block-connecting means to simultaneously incline both of said blocks for movement in a selected direction relative to said frame; and a third apertured block surrounding said stem and being supported at its ends on said frame to resiliently resist movement of said stem relative to said frame.

2. A valve operating mechanism comprising an elongated hollow frame adapted to be secured at one end to a valve body and having a closed end portion adapted to constitute a valve bonnet; a smooth, elongated valve stem slidable lengthwise in said frame and adapted to be connected at one end to a valve gate, said frame having apertured bosses therein providing bearings for said stem; a stuffing box carried by said frame at the closed end thereof surrounding said stem; a manually-operable lever pivotally mounted in one side of said frame; a first-apertured block surrounding said stem and operatively connected with said lever to move said stem lengthwise relative to said frame upon operation of said lever; straight link means pivotally connected to said frame and slidably and pivotally connected to said block to operatively connect said block to said frame; a second-apertured block surrounding said stem at a location spaced from said first block and operatively engaged with said frame to hold said stem in position to which it is brought by said first block; bell-crank link means pivotally mounted on said frame, pivotally and slidably connected with said second block and having a slotted extension surrounding said pivotal connection between said lever and said frame; a pin extending from the end of said extension; a toggle lever mounted on said pivotal connection having arms engaged with said pin and a lug engageable with said straight link means and movable between two operative positions to simultaneously shift both link means and thereby change the tilt of said blocks relative to said shaft to reverse the direction of movement of said stem relative to said frame; a toggle spring operatively connected between said toggle lever and said bell-crank link means to resiliently retain said toggle lever in either of its operative positions; a third block surrounding said stem at a location spaced from said first and second blocks; and spring means resiliently supporting said third block on said frame to resiliently resist movement of said stem relative to said frame.

3. Valve operating mechanism comprising an elongated frame adapted to be secured at one end to a valve body, an elongated valve stem slidably supported in said frame, adapted to be connected at one end to a valve gate and provided at its opposite end portion with external screw threads, reversible, manually-operated jack means carried by said frame frictionally engaging said stem to move said stem longitudinally relative to said frame, and a nut threaded on said screw-threaded portion of said stem and bearing against said frame to impart an initial longitudinal movement to said stem when rotated thereon.

4. Valve operating means comprising an elongated frame adapted to be secured at one end to a valve body, an elongated valve stem slidably supported in said frame adapted to be connected at one end to a valve gate and provided at its opposite end portion with external screw threads, reversible, manually-operated jack means carried by said frame frictionally engaging said stem to move said stem longitudinally relative to said frame including a jack-operating lever pivotally mounted on said frame and having a handle socket thereon, and a jack reversing toggle lever pivotally mounted on said frame and having a handle socket thereon, a nut threaded onto said screw-threaded end portion of said stem bearing against the corresponding end of said frame and having a handle-receiving socket thereon, and a common handle for said jack-operating lever, said jack reversing toggle lever and said nut.

5. Reversible jack mechanism comprising an elongated hollow frame, an elongated stem slidable lengthwise in said frame, a manually movable lever pivotally mounted in one side of said frame, an apertured block surrounding said stem and operatively engaged with said lever to move said stem lengthwise relative to said frame upon movement of said lever about the pivotal connection between said lever and said frame, means pivotally connecting said block to said frame, a second apertured block surrounding said stem at a position spaced from said stem moving block and operatively engaged with said frame to hold said stem in position to which it is brought by said stem moving block, means pivotally connecting said stem holding block to said frame, manually operable means carried by said frame and operatively associated with said block connecting means to simultaneously incline both of said blocks for movement in a selected direction relative to said frame, and a third apertured block surrounding said stem and being supported at its ends on said frame to resiliently resist movement of said stem relative to said frame.

6. A reversible jack mechanism comprising an elongated hollow frame, an elongated stem slidable longitudinally in said frame, said frame having apertured bosses therein providing bearings for said stem, a manually operated lever pivotally mounted in one side of said frame, a first apertured block surrounding said stem and connected to said lever to move said stem lengthwise relative to said frame upon movement of said lever about the pivotal connection between said lever and said frame, straight link means pivotally connected to said frame and slidably and pivotally connected to said block to connect said block to said frame, a second apertured block surrounding said stem at a location spaced from said first block and operatively engaged with said frame to hold said stem in position to which it is brought by said first block, bell crank link means pivotally mounted on said frame and pivotally and slidably connected with said second block, said bell crank link means having a slotted extension surrounding said pivotal connection between said lever and said frame, a pin extending from the end of said extension, a toggle lever mounted on said pivotal connection having arms engaged with said pin and a lug engageable with said straight link means and movable between two operative positions to simultaneously shift both link means and thereby change the tilt of said blocks relative to said stem to reverse the direction of movement of said stem relative to said frame, a toggle spring operatively connected between said toggle lever and said bell crank link means to resiliently retain said toggle lever in either of its operative positions, a third block surrounding said stem at a location spaced from said first and second blocks, and spring means resiliently supporting said third block on said frame to resiliently resist movement of said stem relative to said frame.

CHESTER L. SHOBE.

REFERENCES CITED

The following references are of record in the file of this patent:

UNITED STATES PATENTS

| Number | Name | Date |
|---|---|---|
| 280,912 | Conolly | July 10, 1883 |
| 410,499 | Davis | Sept. 3, 1889 |
| 821,645 | Johnson | May 29, 1906 |
| 962,368 | Long | June 21, 1910 |
| 1,016,334 | Kramer | Feb. 6, 1912 |
| 1,084,996 | Wright | Jan. 20, 1914 |
| 1,110,961 | Reuter | Sept. 15, 1914 |
| 1,153,024 | Brown | Sept. 7, 1915 |
| 1,154,687 | Bogle | Sept. 28, 1915 |
| 1,877,589 | Reed | Sept. 13, 1932 |
| 1,954,643 | Neuhaus | Apr. 10, 1934 |
| 2,515,493 | Craene et al. | July 18, 1950 |